Dec. 29, 1931.  T. COLEMAN, JR  1,838,530
GLASS FURNACE
Filed April 15, 1926  2 Sheets-Sheet 1
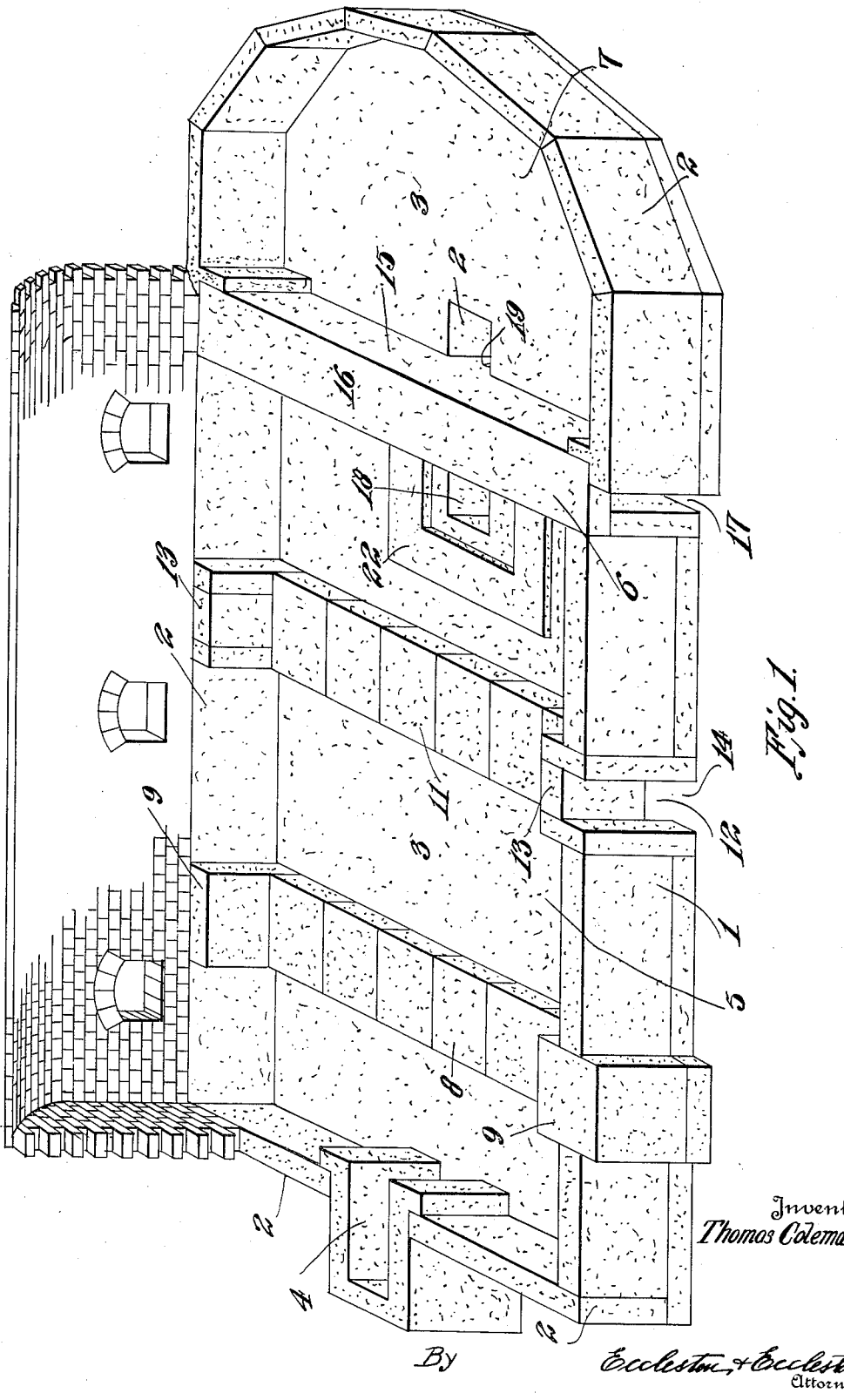
Inventor
Thomas Coleman, Jr.
By Eccleston & Eccleston
Attorneys Dec. 29, 1931.        T. COLEMAN, JR        1,838,530
GLASS FURNACE
Filed April 15, 1926        2 Sheets-Sheet 2
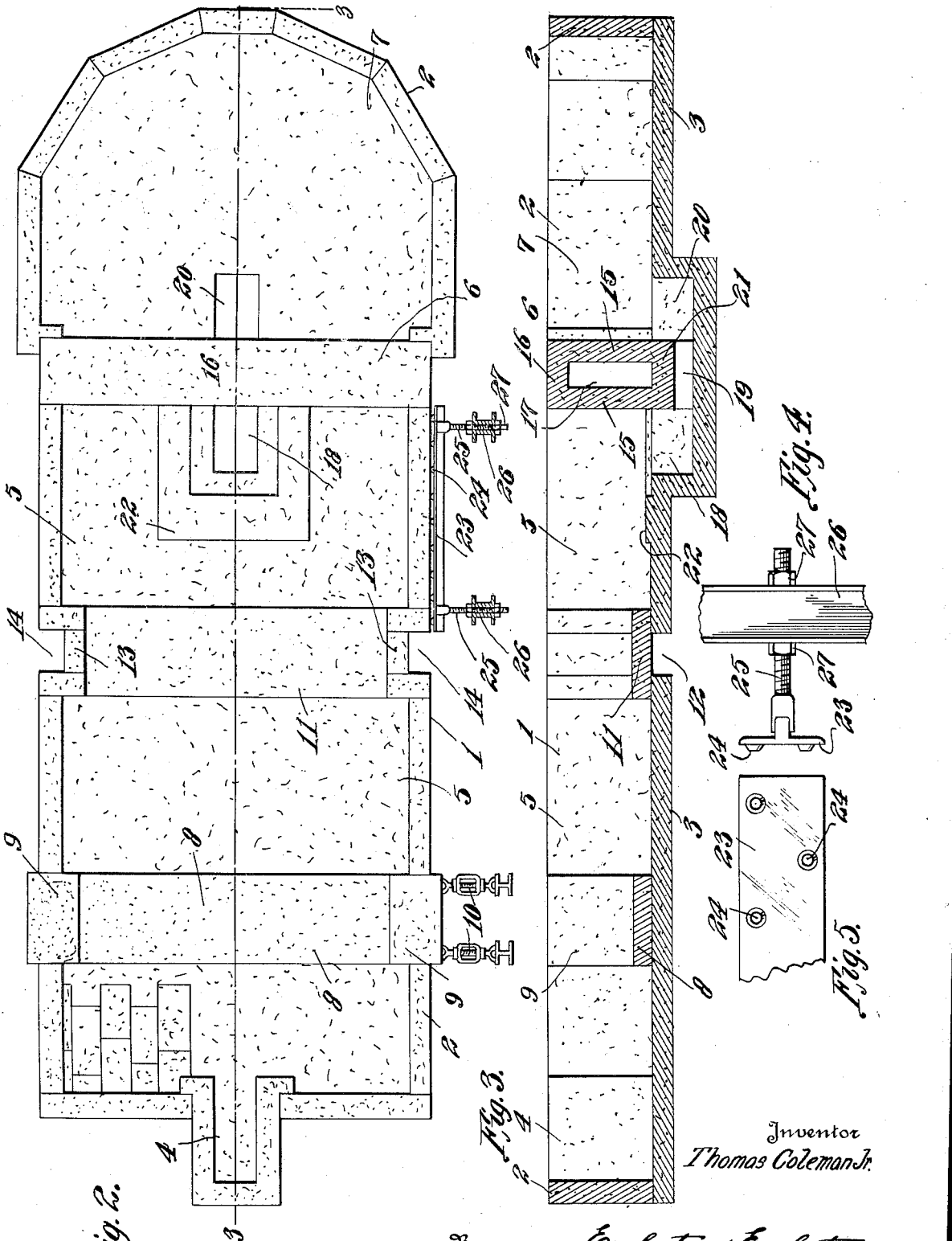
Inventor
Thomas Coleman Jr.
By Eccleston + Eccleston
Attorney Patented Dec. 29, 1931

1,838,530

UNITED STATES PATENT OFFICE

THOMAS COLEMAN, JR., OF CLARKSBURG, WEST VIRGINIA, ASSIGNOR TO HAZEL-ATLAS GLASS COMPANY, OF WHEELING, WEST VIRGINIA, A CORPORATION OF WEST VIRGINIA

GLASS FURNACE

Application filed April 15, 1926. Serial No. 102,152.

It is well known that the life of a continuous glass tank furnace is rather short, sometimes not exceeding three or four months, and seldom exceeding twelve months.

The heavy expense of making repairs and the loss of production from four to eight weeks when a furnace is out of commission, very materially increases production costs, and hence the importance of extending the life of these furnaces.

The rapid destruction of the blocks forming the furnace, is due mainly to two causes; first, the chemical action, which causes the dissolution of the blocks because of the action of the fluxes in the glass batch; and second, the mechanical action, in which the frictional contact of the moving glass causes the wearing away of the blocks. In hand operation, the mechanical action was not very serious, as the glass had many intervals of rest; and tank temperatures were lower than in the present practice; but since the advent of automatic forming machines, where the glass flows continuously, the mechanical action apparently has become more pronounced.

The principal object of the present invention is to extend the life of glass furnaces, by decreasing both the chemical action and the mechanical action of the glass. Numerous attempts have been made to extend the life of these furnaces, but for various reasons, which need not be discussed herein, no practical solution has been evolved heretofore.

If the glass adjacent the walls and bottom of a tank remains there, instead of moving forward in the tank with the glass stream as in the ordinary operation of a tank furnace, then it is apparent that the chemical action of this glass will gradually diminish until a point is reached where further chemical action by this glass on the tank blocks is practically nil. Also, if the glass adjacent the walls and bottom of a tank remains there, then the mechanical action of the glass is also eliminated, for obviously there would be no moving frictional contact between the glass and the blocks forming the side walls and bottom of the furnace. And even though the glass adjacent the walls and bottom of the tank is not maintained stationary, but the movement is retarded, then both the chemical and mechanical action of the glass on the blocks will be reduced in proportion to the extent that the movement of the glass is retarded.

Numerous attempts have been made heretofore to produce the desired results mentioned above, by the use of water jackets entirely or partly surrounding the tank for the purpose of chilling the glass adjacent the walls and bottom of the tank, to prevent it from flowing away. Experiments with these water jacketed tanks have been entirely unsuccessful, and those skilled in the art are convinced that water jacketed tanks, for accomplishing the results hereinbefore mentioned, are not only impracticable, but also are too expensive.

The principal object of the present invention is to provide a practical and inexpensive construction, which produces inactive regions where the glass is quiescent and is in chemical equilibrium with the tank blocks, adjacent to these regions in the side walls and bottom of a tank; and I accomplish this by providing the tank with obstructions to prevent or retard the movement of the glass adjacent the walls and bottom of the tank. In the further description of my invention I will designate as inactive regions these quiescent portions of glass where little or no motion or chemical action takes place. While I have shown, and will describe the specific preferred structure, yet it is to be understood that the invention relates broadly to any structure or method of producing the inactive regions by the use of obstructions of any character whatever, or by the use of anything which is the equivalent of an obstruction or hindrance to the movement of the glass, for the purpose described.

The specific form of the construction will now be described, reference being had to the accompanying drawings; in which, Figure 1 is a perspective view of the improved glass tank, with the upper walls thereof removed.

Figure 2 is a plan view of the improved tank, with the upper walls removed.

Figure 3 is a vertical sectional view taken on line 3—3 of Figure 2.

Figure 4 is a detail side elevational view of an improved stay bar; and

Figure 5 is a fragmentary front elevational view of the stay bar.

Referring to the drawings more in detail, numeral 1 indicates the glass tank, which has the same general form as the tanks now in common use; the walls of the tank being referred to by numeral 2, and the bottom being referred to by numeral 3. In accordance with the ordinary construction, the tank comprises the usual filling in point 4, the melting compartment 5 extending from the filling in point to the bridge wall 6, and the refining compartment 7 extending forwardly from the bridge wall to the end of the tank.

All of the above-mentioned structure is in accordance with the usual and well known continuous tank furnace practice; and in accordance with such practice the walls and bottom of the tank are built up of blocks, and while for purposes of convenience in illustrating, I have not shown all of the parts as formed of blocks, yet it will be understood that such is the case.

For reasons hereinbefore given, these blocks are subject to rapid destruction, from both the chemcial and the mechanical action of the glass; and I shall now describe the means for producing inactive regions of glass, whereby the destructive chemical and mechanical action of the glass is largely eliminated.

For the purpose of producing the inactive regions, I provide a plurality of obstructing walls in the tank, and extending across the tank bottom and up the side walls of the tank. Obviously these obstructing walls may vary in number, size, construction, etc. It will be understood, of course, that the obstructing walls may be of different depths in different installations, depending upon the desired depth of glass in the inactive regions.

The first of these obstructing walls is formed of a plurality of blocks 8 arranged in abutting relation and extending entirely across the tank bottom. At the ends of the transversely extending obstructing wall, I provide a vertically extending obstructing wall 9. These vertical walls may be formed of thick blocks which project into the tank, or they may be built up of a plurality of vertically or horizontally arranged blocks. In the specific form here illustrated, screw jacks 10 may be employed to push the blocks forming the vertical walls 9, 9, inwardly to the desired extent, to take care of the gradual wearing away of these blocks.

The horizontal portion 8 of the obstructing wall will prevent or impede the flow of the glass which is between the supply end of the tank and the obstructing wall, and which is below the level of the obstructing wall, so that an inactive region covering the tank bottom from the supply end of the tank to the obstructing wall, is provided. And the vertical walls 9, 9, prevent or impede the flow of the glass which is adjacent to the tank side walls, and between the supply end wall of the tank and the vertical obstructing walls; so that an inactive region covering each side wall from the supply end of the tank to the vertical obstructing walls, is provided.

About midway of the remainder of the melting compartment of the tank, I provide another obstructing wall which may be of the same construction as the wall described above, or which may be of the specific form illustrated, or which may be of any other desired construction providing it is such that it will cause an inactive region by preventing or hindering the movement of the glass. In the specific form illustrated, the horizontal wall is formed by blocks 11 arranged in abutting relation and extending entirely across the tank, just as in the first-described wall, but in this construction the tank bottom is partly omitted beneath the blocks 11, so that an air passage 12, for cooling purposes, extends the entire length of the obstructing wall, and at the ends thereof the passage communicates with the atmosphere. In substantially the same manner the blocks 13 forming the vertical obstructing walls at the ends of the horizontal wall, are arranged to provide vertical air passages 14. The passages 12 and 14 will, of course, assist in cooling the obstructing walls, thereby extending the life of these walls, and if desired the cooling effect of the passages may be increased by the artificial supply of air to the passages, as by means of blowers. Of course any desired cooling means may be employed in connection with this or other obstructing walls, if desired. It will also be understood, in connection with this specific form of obstructing wall, that when the vertical blocks 13 are practically worn away, other blocks may be arranged in place in back of these blocks, and be pushed inwardly to take the place of the worn blocks.

The horizontal obstructing wall 11 will cause an inactive region over the tank bottom between the wall 8 and the wall 11; and the walls 13 cause inactive regions along the tank side walls between the obstructing walls 9, 9, and the obstructing walls 13, 13.

Numeral 6 indicates the bridge wall which divides the refining compartment 7 from the melting compartment 5. In the specific form illustrated the bridge wall is formed by two spaced rows of vertically arranged blocks 15, supporting on their upper edges a row of horizontally placed blocks 16, thereby forming an air passage 17 extending entirely through the bridge wall and communicating with the atmosphere at both ends. Of course the bridge wall may be of any desired construction, and water cooling means may be provided, if desired.

The bottom of the melting tank is provided with an opening 18, adjacent the bridge wall, and this opening communicates with a channel 19 leading under the bridge wall, and communicating with an opening 20 in the bottom of the refining compartment of the tank. That portion of the air cooling passage 17 which extends through the channel 19, has its lower side closed by means of blocks 21, as shown in Figure 3. It will be understood, of course, that the glass from the melting compartment flows through the opening 18, channel 19, and opening 20, into the refining compartment 7.

Built around the opening 18 in the melting compartment, is an obstructing wall 22; and it is apparent that this wall, together with the obstructing wall 11 and the bridge wall 16, will form an inactive region over this portion of the bottom of the melting compartment. And the vertical obstructing walls 13, 13, together with the bridge wall 16 will form inactive regions along the side walls of this portion of the melting compartment.

While several specific forms of obstructing walls have been described above, it is to be understood that the present invention is in no manner limited to any specific construction of the obstructing walls, nor is it even limited to obstructing walls, but relates broadly to a method and means for forming inactive regions by the use of any means obstructing or impeding the movement of the glass. There may be any number of obstructing walls; the walls may be constructed as desired; the blocks forming the vertical walls may be inclined to the tank wall instead of parallel thereto; the blocks forming the horizontal walls may be inclined instead of parallel with the tank bottom; in place of vertical obstructing walls inwardly projecting blocks may be arranged in the side walls of the tank in any desired manner to provide inactive regions between the blocks; in place of horizontal obstructing walls upwardly projecting blocks may be arranged in the floor of the tank in any manner to provide inactive regions therebetween; and as stated hereinbefore, the invention contemplates the use of any construction or arrangement of any obstructing means for providing inactive regions along the sides and bottom of glass tanks. By the provision of these inactive regions the glass adjacent the walls and bottom of the tank remains there, instead of being carried away as in the ordinary operation of a tank furnace. The result is that the chemical action of the glass on the blocks is at first quite rapid, but this chemical action gradually diminishes as the glass in the inactive region becomes saturated; and further, the mechanical action of the glass on the blocks is also greatly reduced, for there is almost no moving frictional engagement between the glass and the sides or bottom of the tank.

Another advantage resulting from the creation of these inactive regions is that they act as traps for the retention of fragments of iron or other metals that often find their way into glass batch or cullet and which are often carried well forward into the tank along the smooth bottom ordinarily used by the forward moving glass. When such fragments of tramp iron or other metals are carried forward in the tank they act as centers of contamination and colored stream of glass originating at the glass-metal surface often will ruin the quality of the glass emerging from one or more of the flowspouts. When iron is retained in an inactive region well back in the tank these contaminated streams of stained glass will not be formed as the colored glass will not be moved from the place where it originates at the metal glass surface.

An improved stay bar for glass furnaces is illustrated in Figure 2, and detail views of the bar are shown in Figures 4 and 5. One of the objectionable features of the use of stay bars to keep the block in place, has been that the contact between the bars and the blocks prevents the blocks from being properly cooled. In the construction disclosed herein numeral 23 indicates the stay bar, which is preferably in the form of a T-iron. Attached to the face of the stay bar are a number of lugs or studs 24; the studs being spaced, and preferably staggered. The T-iron constituting the stay bar, is carried by rods 25 mounted in frame members 26. The rods 25 are threaded and provided with nuts 27 on opposite sides of the frame members, whereby the stay bars may be adjusted against the tank blocks.

In accordance with the above described construction the face of the stay bar is spaced from the face of the blocks, thereby providing for a free circulation of air or water for cooling the blocks.

Having fully described the invention, what I claim as new and desire to secure by Letters Patent is:

1. A continuous glass tank furnace in which the glass has a substantially plane surface and moves longitudinally of the furnace toward the delivery end thereof, and including a melting compartment, a refining compartment, a bridge wall between the two compartments, a plurality of blocks at intervals in the floor of the melting compartment and projecting upwardly beyond the floor level to obstruct or impede the longitudinal movement of the glass and thereby form inactive regions of glass, for the purpose specified.

2. A continuous glass tank furnace in which the glass has a substantially plane surface and moves longitudinally of the furnace toward the delivery end thereof, and including a melting compartment, a refining compartment, a bridge wall between the two compartments, a plurality of blocks at intervals in the side walls of the melting compartment and projecting inwardly beyond the face of the walls to obstruct or impede the longitudinal movement of the glass and thereby form inactive regions of glass, for the purpose specified.

3. A continuous glass tank furnace in which the glass has a substantially plane surface and moves longitudinally of the furnace toward the delivery end thereof, and including a melting compartment, a refining compartment, a bridge wall between the two compartments, a plurality of blocks at intervals in the floor of the melting compartment and projecting upwardly beyond the floor level, a plurality of blocks at intervals in the side walls of the melting compartment and projecting inwardly beyond the face of the walls, all of said blocks obstructing or impeding the longitudinal movement of the glass and thereby forming inactive regions of glass, for the purpose specified.

THOMAS COLEMAN, Jr.